United States Patent [19]

Fenwick

[11] Patent Number: 5,261,101
[45] Date of Patent: Nov. 9, 1993

[54] METHOD FOR CALLING AND RETURNING FROM A SUBROUTINE THAT IS INVOKED BY EITHER A NEAR CALL OR A FAR CALL

[75] Inventor: Thomas Fenwick, Redmond, Wash.

[73] Assignee: Microsoft Corporation, Redmond, Wash.

[21] Appl. No.: 486,067

[22] Filed: Feb. 28, 1990

[51] Int. Cl.⁵ ............................ G06F 9/40; G06F 9/42
[52] U.S. Cl. .......................... 395/700; 364/DIG. 1; 364/261.4; 364/255.1
[58] Field of Search .................. 364/261.4, 255.1; 395/700

[56] References Cited

U.S. PATENT DOCUMENTS 4,944,578 7/1990 Denison ..................... 350/347 E

Primary Examiner—Gareth D. Shaw
Assistant Examiner—Jon H. Backenstose
Attorney, Agent, or Firm—Seed and Berry

[57] ABSTRACT

A method for calling and returning from a computer subroutine is provided. The method allows a subroutine executing on a stack-oriented computer with segmented addressing, such as the Intel 80386, to be invoked by both an inter-segment call and an intra-segment call instruction. The method allows multiple subroutines in one code segment to share an inter-segment return instruction. The method further provides for the locating of that instruction so that the pushing of its offset onto the stack can be accomplished efficiently.

17 Claims, 28 Drawing Sheets

METHOD FOR CALLING AND RETURNING FROM A SUBROUTINE THAT IS INVOKED BY EITHER A NEAR CALL OR A FAR CALL

TECHNICAL FIELD

This invention relates to a method for calling and returning from a computer subroutine during execution of a computer program, and more specifically, a method for programming to handle both inter-segment and intra-segment subroutine linkage.

BACKGROUND OF THE INVENTION

A computer program is a collection of computer instructions ordered in a manner such that when the program is executed by the computer the computer will produce certain results. Computer programs can be very simple, containing only a few instructions. Conversely, computer programs can be very complex, containing millions of instructions. For example, a certain type of computer program called an operating system can be extremely complex and often contains over a million instructions.

Most computer programs need to perform a certain task at several different places in the program. For example, an operating system may need to perform the task of writing to a display at many different places in the program. The programmer could simply repeat the same set of instructions at each place in the program. Having the same instructions duplicated throughout the program is usually undesirable for several reasons. If a change is made to the set of instructions, then the set must be changed wherever it is repeated in the program. Such changes may be time-consuming and error-prone. Also, having the same instructions repeated several times tends to make the program large, resulting in a program that may not fit into the memory of the computer.

The concept of a "subroutine" developed early in the history of computers. A subroutine is a set of instructions that is stored only once in a program, but can be "called" from several different places in a program. When a subroutine is called, the computer starts executing the instructions in the subroutine. When a "return" instruction in the subroutine is executed, the computer then "returns," that is, resumes execution of the program at the instruction after the call. In effect, the set of instructions is as if it was inserted into the program at the call.

Subroutines have several advantages over the duplicating of the set of instructions. Subroutines save space in the program, since the set of instructions is stored only once. Subroutines make it easier to organize complex programs. Subroutines make it easier to make changes to the set of instructions, since the changes need only be made once.

The state-of-the-art computers, such as those based on Intel 8086-family microprocessors, have special-purpose instructions to facilitate the calling of and returning from subroutines. Specifically, there are two instructions for calling and two instructions for returning.

The Intel 8086-family of microprocessors uses a segmented addressing architecture. One such microprocessor is the Intel 80386, which is manufactured by the Intel Corporation of Santa Clara, Calif. The design and operation of the Intel 80386 is described in detail in a publication entitled "iAPX 386 Programmer's Reference Manual Including the iAPX 386 Numeric Supplement," which is available from Intel Corporation and is hereby incorporated by reference. The Intel 80386 has one call instruction and one return instruction that are for invoking an intra-segment (a near) subroutine and another call instruction and return instruction that are for invoking an inter-segment (a far) subroutine.

The addresses in the 8086-family comprise a segment and an offset. Each call and return must specify a segment and an offset. When a call or return is executed, the microprocessor combines the segment and the offset to form an address. The call instruction forms the address of the subroutine; the return instruction forms the address of the instruction to return to. The methods of calling and returning from subroutines is referred to as subroutine "linkage."

The near call and return are designed to be used when the call instruction and called subroutine are within the same segment when executed, that is, the current code segment. The code segment (CS) register contains information pointing to the current code segment. When a near call is executed, the processor pushes onto the stack the offset in the current segment of the instruction after the call instruction. The processor then jumps to the subroutine, which is located at a specified offset in the current code segment. When the subroutine returns, it executes a near return instruction. When the near return instruction is executed, it pops the offset, which was pushed onto the stack by the near call instruction, from the stack. The processor then forms an address based on current code segment and the offset. This address is the address of the instruction after the near call instruction. The processor then proceeds to execute the instruction at that address.

The limitation of the near call and return instructions is that only subroutines within the same segment can be called. The far call and return instructions have no such limitation.

The far call and return instructions work similarly to their near counterparts, except that these instructions push and pop both a segment and offset component. The far call specifies both a segment and an offset for the subroutine. Consequently, the current setting of the CS register is saved on the stack in addition to the offset of the instruction after the call. When the far return instruction is executed, the processor pops the segment and offset values pushed by the corresponding call instruction, forms an address, and returns to that address. The far call can specify any address and, unlike the near call, is not limited to those addresses within the current code segment.

A typical subroutine is designed to be called either by a near call instruction or a far call instruction. If designed to be called by a near call instruction, then the subroutine executes a near return instruction, which pops only the offset, to return. If designed to be called by a far call instruction, then the subroutine executes a far return instruction, which pops both the segment and offset, to return. If a subroutine that is designed to be called by a far call is invoked by a near call, then the subroutine will not return to the instruction after the far call. This mixing of near call with far return or mixing of a far call with a near return will result in a program error.

Several methods have been used for allowing a subroutine to be invoked by both a near and a far call instruction. One of these methods of subroutine linkage uses different entry points when the subroutine is invoked by a near call and a far call.

It would be desirable to have an improved method for subroutine linkage so that a subroutine can be invoked by either a far call or a near call.

DISCLOSURE OF THE INVENTION

It is an object of the present invention to provide a method for linking subroutines so that the subroutines can be efficiently invoked by both far calls and near calls.

It is another object of the present invention to provide a method for linking subroutines such that the number of instructions executed is reduced.

These and other objects, which will become apparent as the invention is more fully described below, are obtained by providing an improved method of subroutine linkage. In a preferred embodiment, a subroutine is designed to be invoked by both a near call and a far call. The subroutine has a near entry point and a far entry point. When the subroutine is invoked through the near entry point, it executes a near return upon completion. When the subroutine is invoked through the far entry point, it first pushes an offset (stored in one byte) of a far return instruction onto the stack. It then starts executing at the near entry point. When the near return instruction is executed, it pops the offset pushed by the instruction executed at the far entry point. The processor then continues execution at the far return instruction, which the offset points to, to effect a return to the instruction after the far call.

DETAILED DESCRIPTION OF THE INVENTION

Figure 1A:
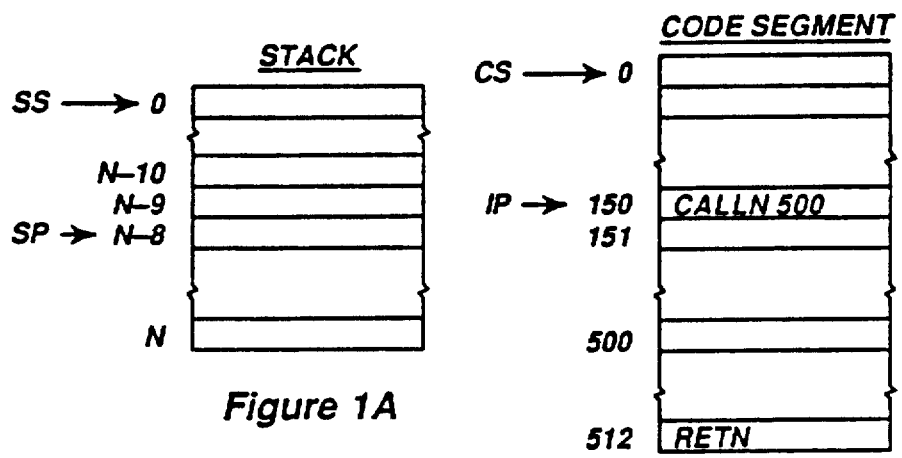
FIGS. 1A through 1D trace the execution of a near call and a near return of prior systems.

A preferred embodiment of the present invention provides a method for linking subroutines in a way that the subroutine may be invoked using both a far call and a near call. The description of the invention that follows uses the term "address" symbolically. One skilled in the art will appreciate that the instructions referred to may be multi-byte instructions. However, the addresses used refer to the logical addresses of the instructions. For example, the "CALLN 500" stored at logical address 150, is a multi-byte instruction. However, the next instruction is shown at address 151, instead of address 150 plus the number of bytes in the "CALLN 500" instruction.

An example of the subroutine linking used in prior systems is shown in FIGS. 1A through 1D and 2A through 2D. FIGS. 1A through 1D show the linking method for calling a near subroutine. The stack shows the state of the stack at various times during calling and returning from the subroutine. The Stack Segment (SS) register points to the segment that contains the stack, and the Stack Pointer (SP) register contains the offset in SS of the top of the stack. The code segment contains the program that calls the subroutine and the subroutine. The Code Segment (CS) register points to the segment that contains the code, and the Instruction Pointer (IP) register contains an offset into the code segment of the instruction currently being executed. One skilled in the art will appreciate that the various microprocessors in the 8086-family employ different techniques for mapping a value in a segment register to a segment address. However, a segment register points either directly or indirectly to a segment. The subroutine is stored at offset 500 through 512 in the code segment. The entry point of the subroutine being at offset 500. The near return (RETN) for the subroutine is stored at offset 512. The near call which invokes the subroutine is stored at offset 150 in the code segment. The call instruction is "CALLN 500." The "CALLN" represents the operation code for the near call, and the "500" represents the entry point of the subroutine to be invoked.

Figure 1B:
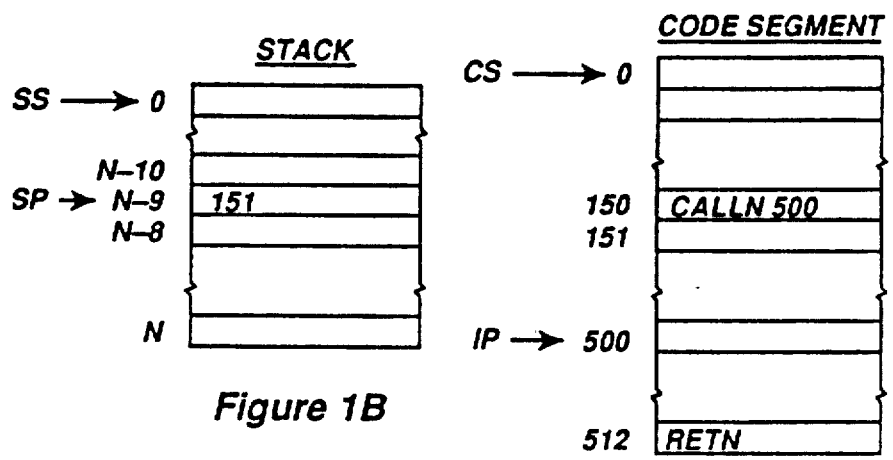

FIG. 1A shows the state of stack, code segment, and associated registers (referred to as state of the processor in the following) just before the execution of the CALLN instruction at offset 150 in the code segment. FIG. 1B shows the state of the processor after execution of the CALLN instruction. When the CALLN was executed, the next address after the CALLN instruction, that is, offset 151 in the code segment, was pushed onto the stack. The IP register was set to 500, which is the entry point of the subroutine.

Figure 1C:
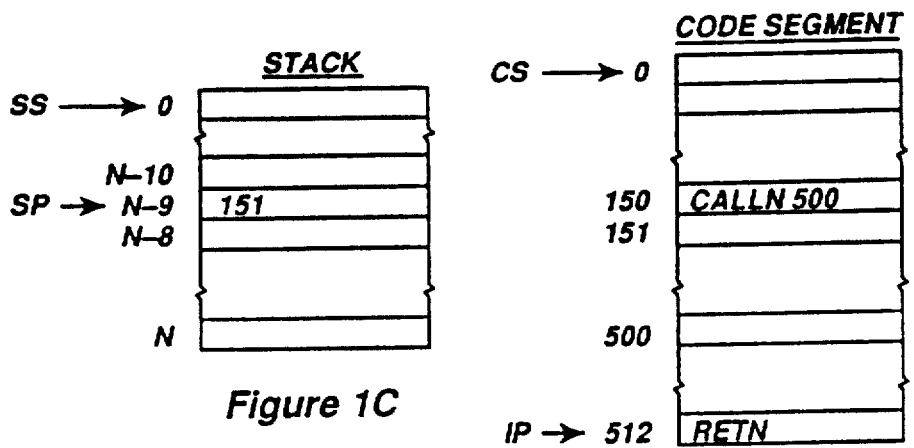

FIG. 1C shows the state of the processor just before the subroutine executes the near return (RETN) instruction. The IP register points to the RETN instruction. Although the subroutine may have pushed data on and popped data off the stack, the SP register points to the return offset in the code segment. The RETN instruction causes the stack to be popped and the IP register to be set to the popped value, offset 151 in this example.

Figure 1D:
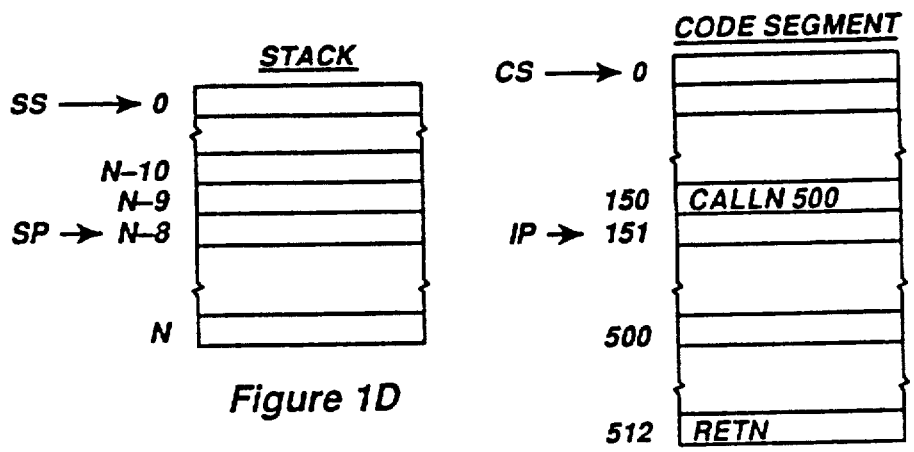

FIG. 1D shows the state of the processor after the RETN instruction is executed. The stack no longer contains the offset and the IP register points to the instruction immediately following the CALLN instruction.

FIGS. 2A through 2D show an example of the linking method of prior systems for calling a far subroutine. The stack shows the state of the stack before the far call (CALLF) instruction is executed. The SS register points to the segment that contains the stack, and the SP register contains the offset in SS of the top of the stack. In this example, the code segment number 10 contains the program that calls the subroutine, and the code segment number 27 contains the subroutine. The CS register points to the code segment currently being executed. The IP register contains an offset into the current code segment of the instruction to be executed next. The subroutine is stored at offset 500 through 512 in the code segment number 27. The entry point of the subroutine is at offset 500 in code segment number 27. The far return (RETF) from the subroutine is stored at offset 512 in code segment number 27. The far call which invokes the subroutine is stored at offset 150 in code segment number 10. The call instruction is "CALLF 27:500." The "CALLF" represents the operation code for the far call and the "27:500" represents the entry point of the subroutine to be invoked. The "27" is the code segment number of the segment where the subroutine is located. The "500" contains the offset in code segment number 27 of the entry point to the subroutine.

Figure 2A:
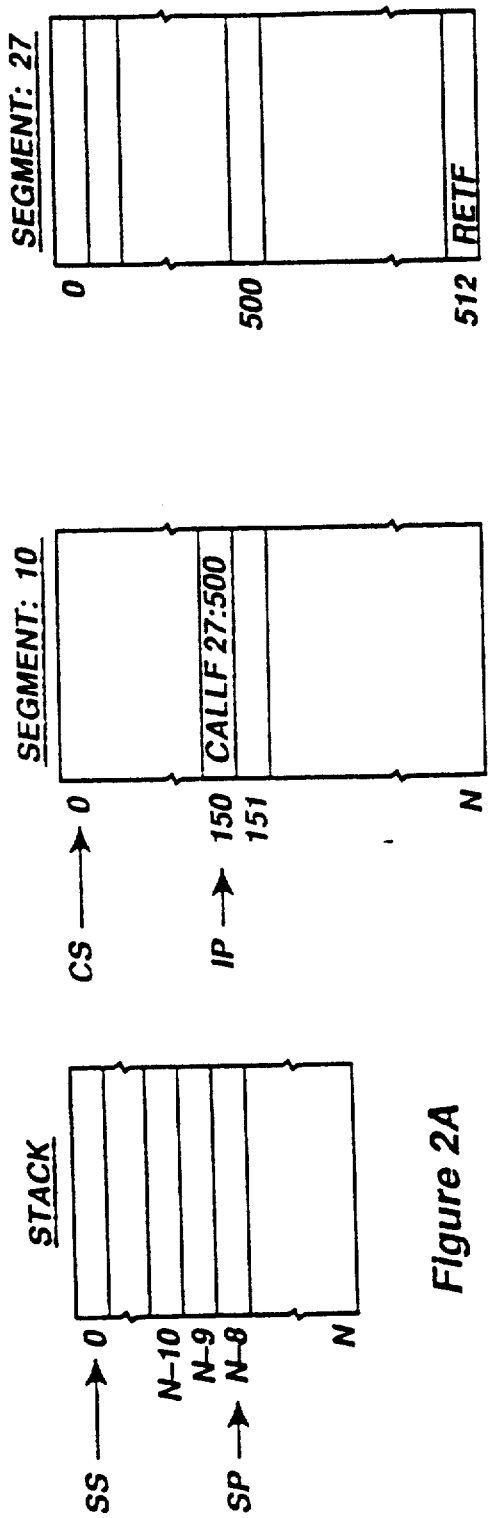
FIGS. 2A through 2D trace the execution of a far call and far return of prior systems.
Figure 2B:
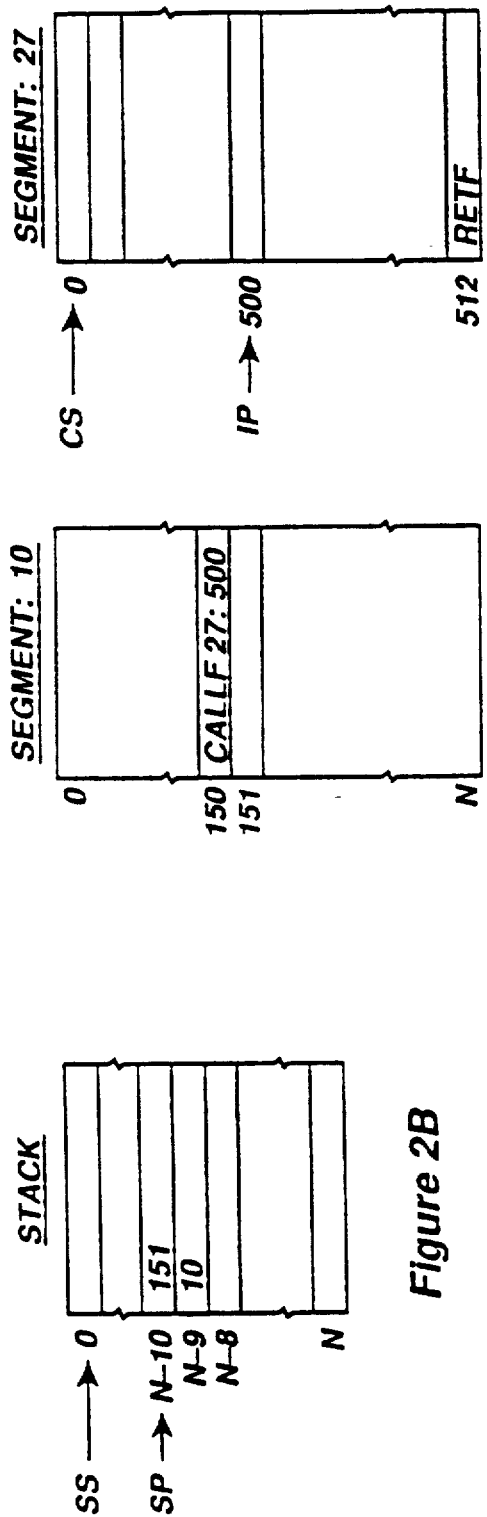

FIG. 2A shows the state of the processor before the CALLF instruction is executed. As shown in FIG. 2B, the CALLF instruction causes the current code segment number 10 to be pushed onto the stack. The offset of the instruction after the CALLF, that is, offset 151 is also pushed onto the stack. The CALLF instruction causes the CS register to be set to 27, which is the segment number where the subroutine is located. The CALLF instruction also causes the IP register to be set to 500, which is the offset into code segment number 27 of the entry point of the subroutine.

Figure 2C:
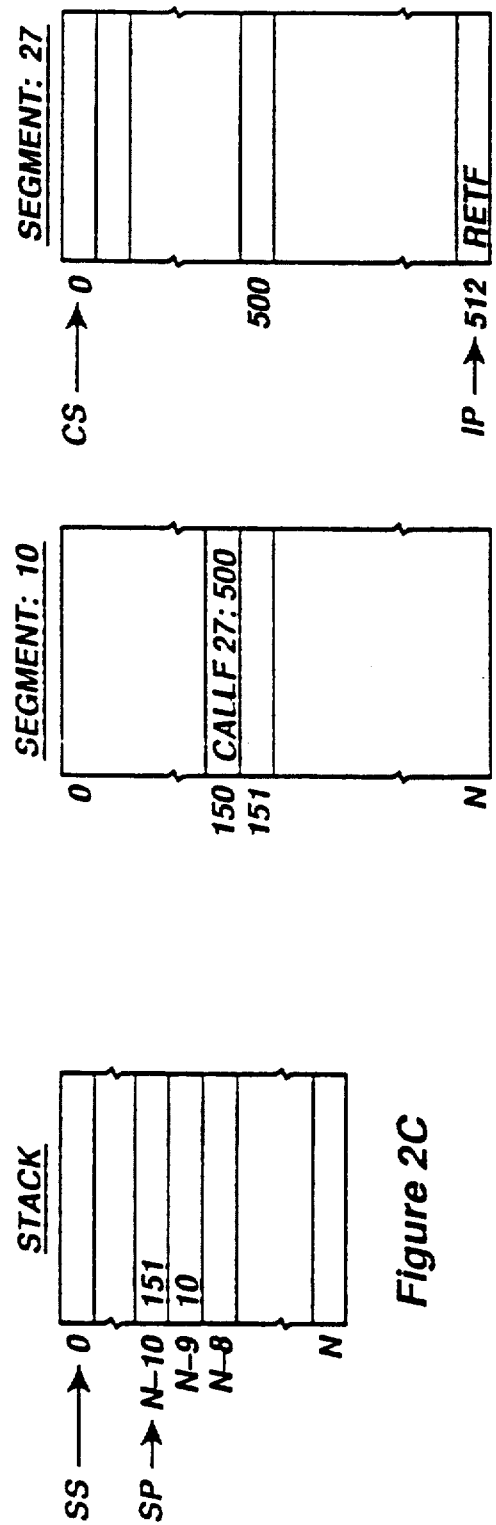
Figure 2D:
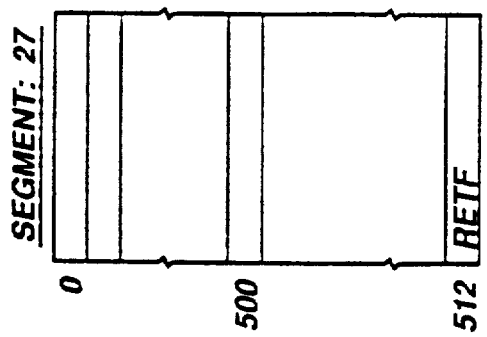
Figure 2D:
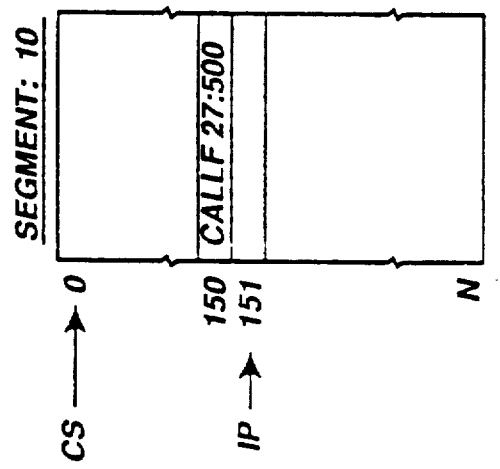
Figure 2D:
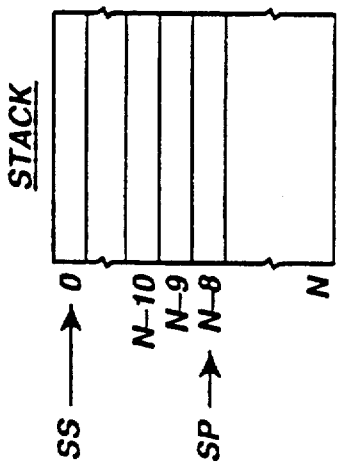

FIG. 2C shows the state of the processor before the RETF instruction of the subroutine is executed. The RETF instruction causes the stack to be popped twice. The IP register is set to first popped value which is the offset in code segment number 10 at which the subroutine is to return to. The CS register is set to point to code segment number 10. This effects the return from the subroutine. FIG. 2D shows the state of the processor after the return from the subroutine.

Figure 3A:
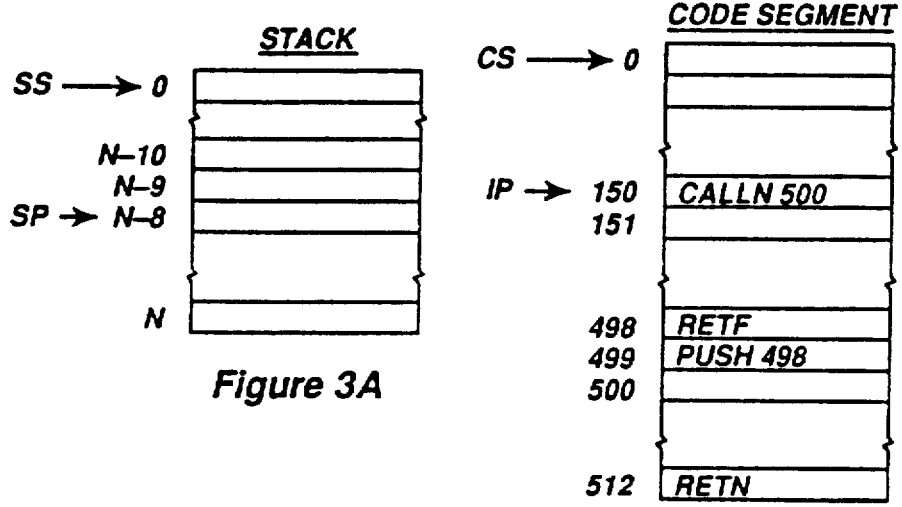
FIGS. 3A through 3D trace the execution of a near call and near return.
Figure 3B:
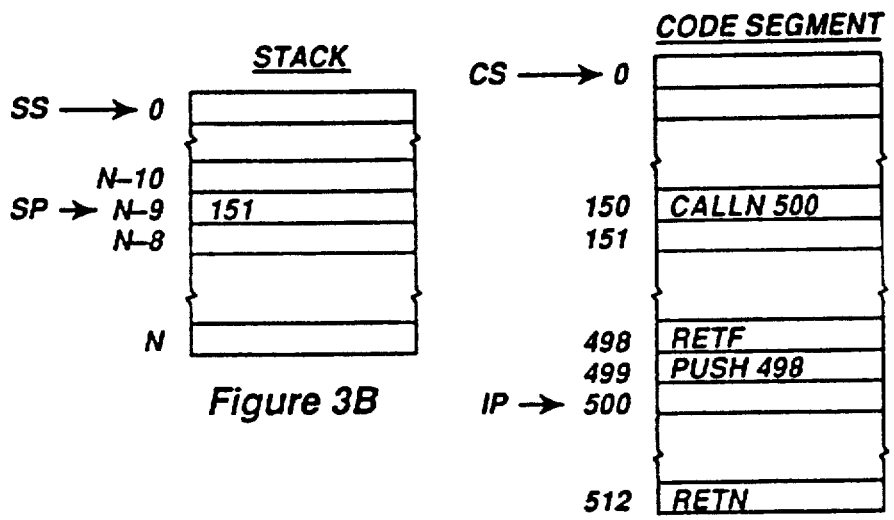
Figure 3C:
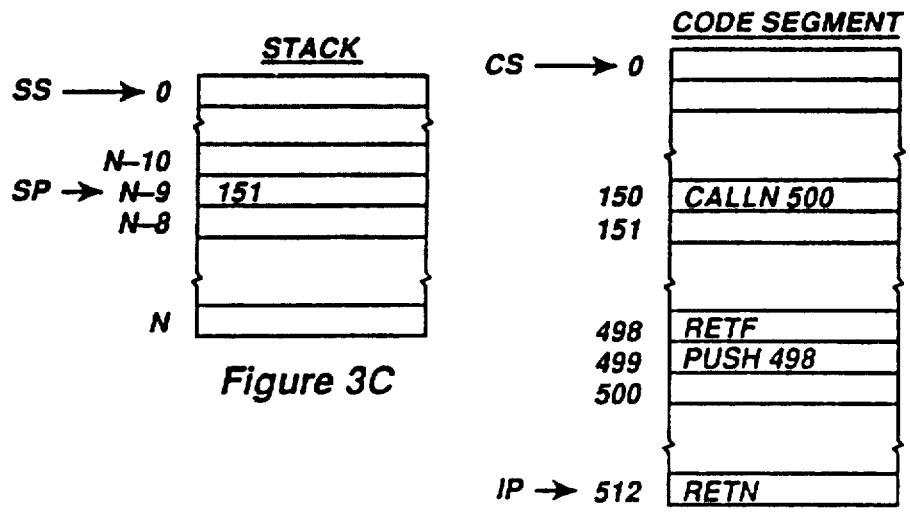
Figure 3D:
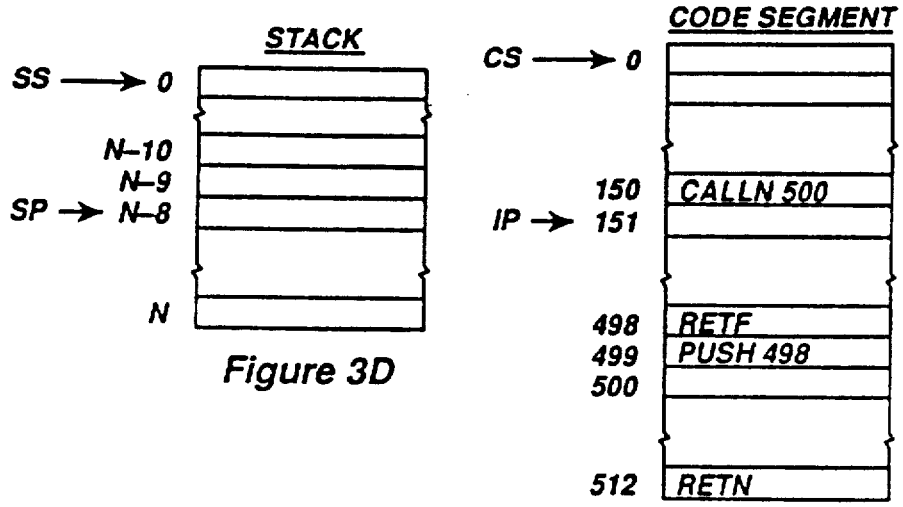

FIGS. 3A through 3D show a method of near subroutine linkage. FIG. 3A shows a code segment which contains a subroutine. The subroutine has two instructions added to support subroutine linkage. One instruction is a RETF instruction and the other instruction is a PUSH instruction. The PUSH instruction pushes the offset of the RETF instruction onto the stack. As shown in FIG. 3A, the RETF instruction is stored two instructions before the entry point of the subroutine at offset 498, and the PUSH instruction is stored one instruction before the entry point at offset 499.

The instruction sequence shown in FIGS. 3A through 3D is identical to the sequence shown in FIGS. 1A through 1D. The advantages of including the RETF and the PUSH instructions before a subroutine can be illustrated by a far call invoking the subroutine.

Figure 4A:
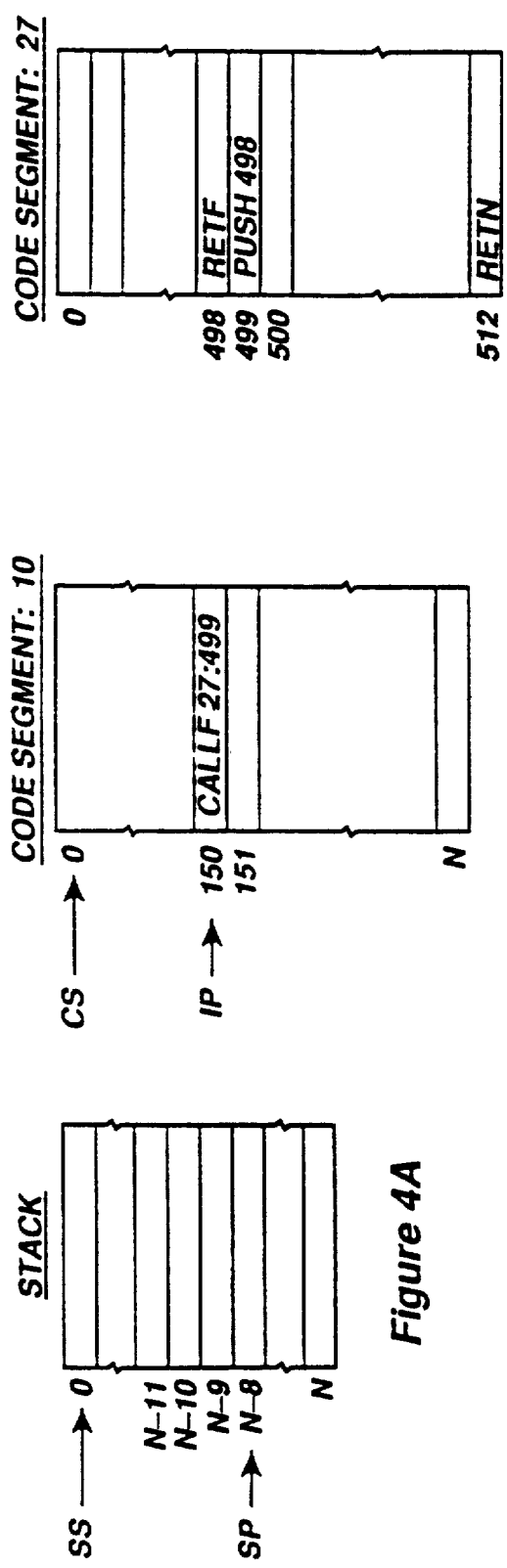
FIGS. 4A through 4F trace the execution of a far call and far return.

FIGS. 4A through 4F trace the execution of a far call to the subroutine. The subroutine is stored in a different code segment than the location of the far call. In the example of FIG. 4A, the subroutine is the same as that shown in FIG. 3A, except that it is stored in a different code segment. The same two instructions, RETF and PUSH, are placed before the entry point at offset 500. The subroutine also has a RETN instruction at offset 512. The call instruction in code segment 10 is a far call that specifies an entry point of offset 499, rather than 500. The entry point at offset 499 is referred to as the far entry point. The entry point at offset 500 is referred to as the near entry point.

Figure 4B:
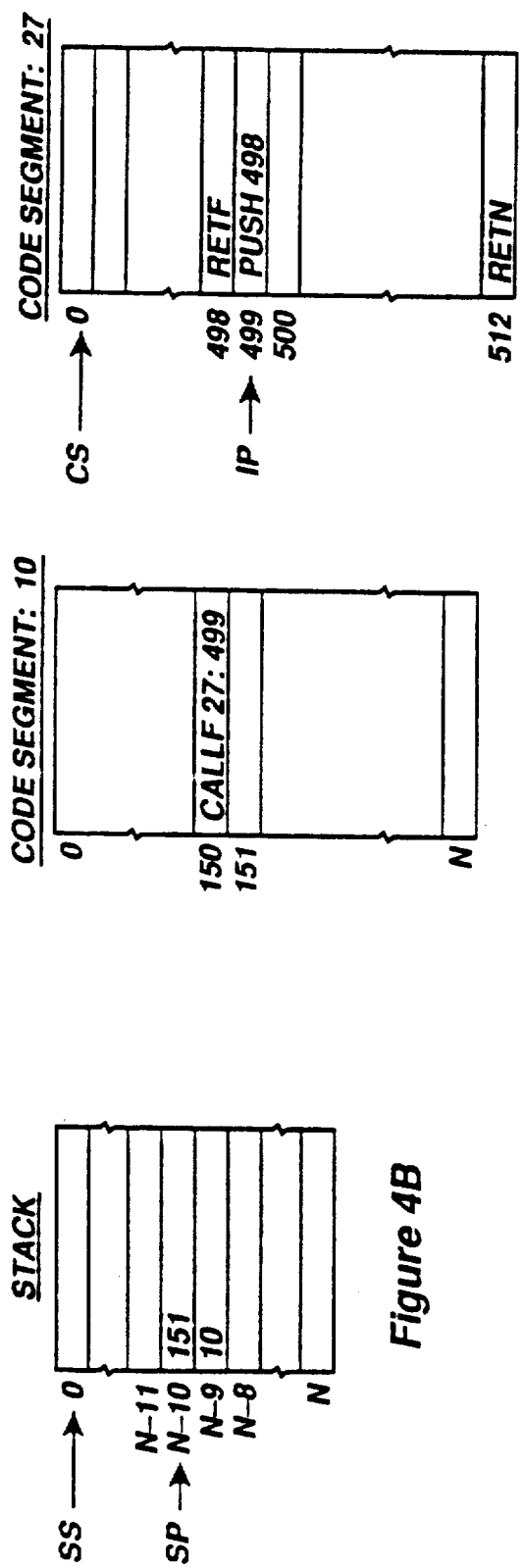

Tracing the execution of the far call and far return will show how the same subroutine can be invoked either by a far call or a near call and return to the proper address which is the address of the instruction after the calling instruction. FIG. 4A shows the state of the processor before the "CALLF 27:499" instruction is executed. The execution of the far call causes the return address, that is, the code segment number 10 and the offset 151, to be pushed onto the stack. The execution also causes the CS register to be set to 27 and the IP register to be set to 499. The offset 499 can be considered a secondary entry point into the subroutine. The 499 entry point is used by far calls. FIG. 4B shows the state of the processor after the CALLF instruction is executed.

Figure 4C:
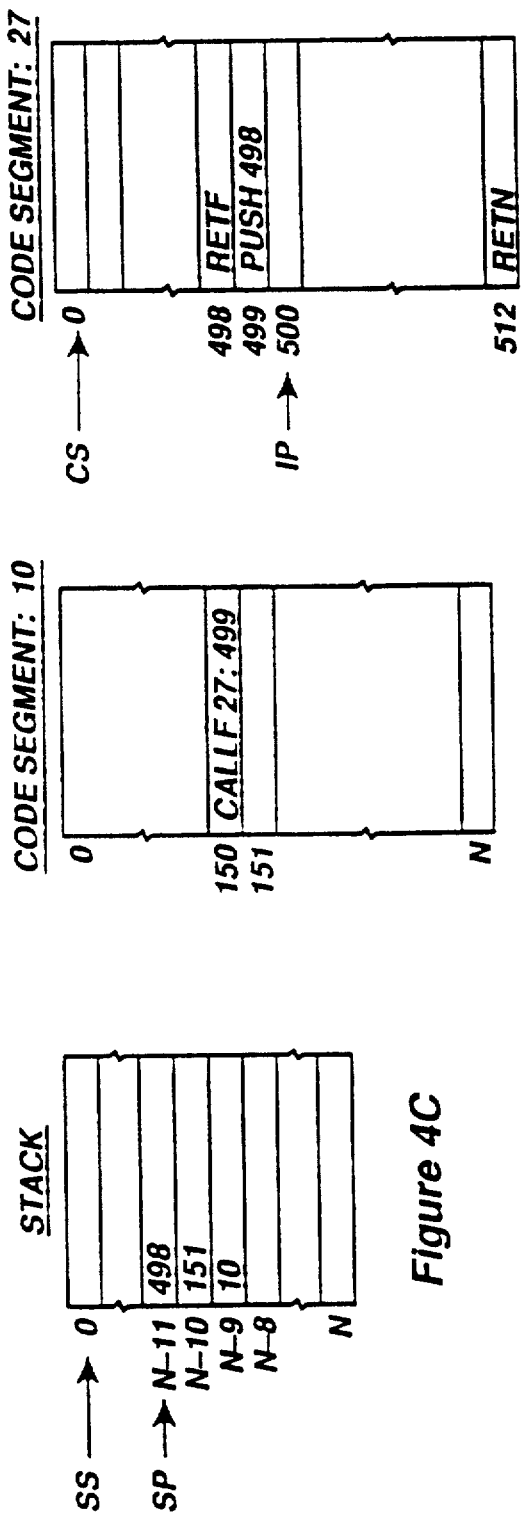

FIG. 4C shows the state of the processor after the "PUSH 498" instruction is executed. The PUSH instruction pushes the offset 498 of the RETF instruction onto the stack and the IP register is set to point to the next instruction, which is at offset 500.

Figure 4D:
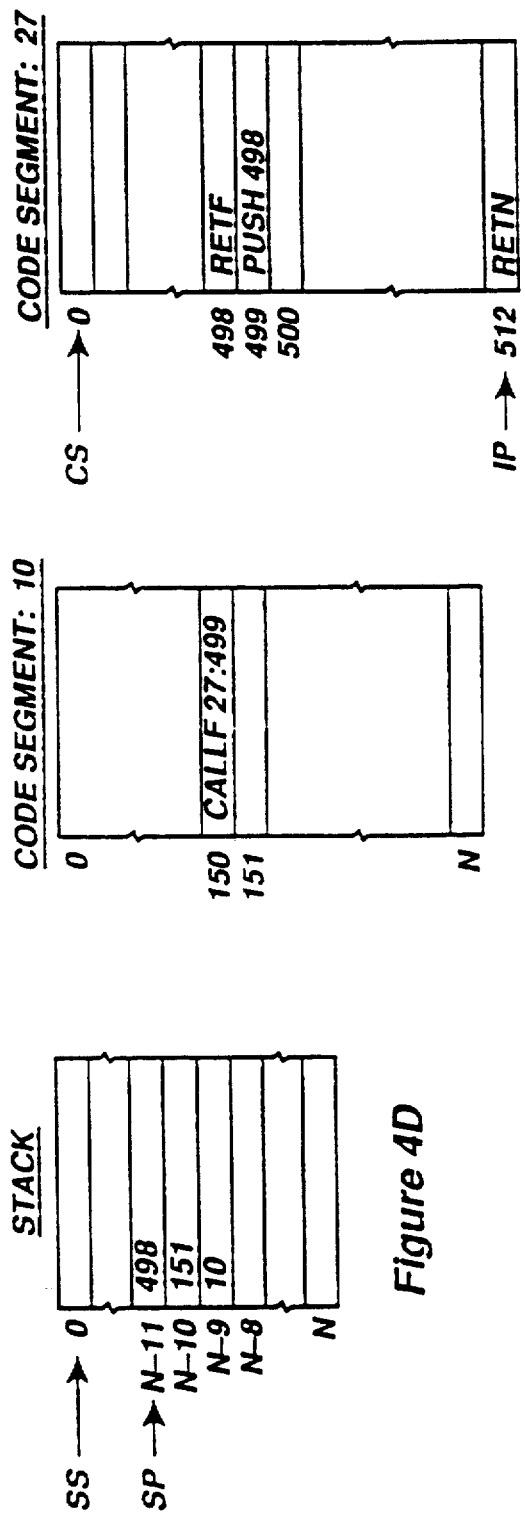
Figure 4E:
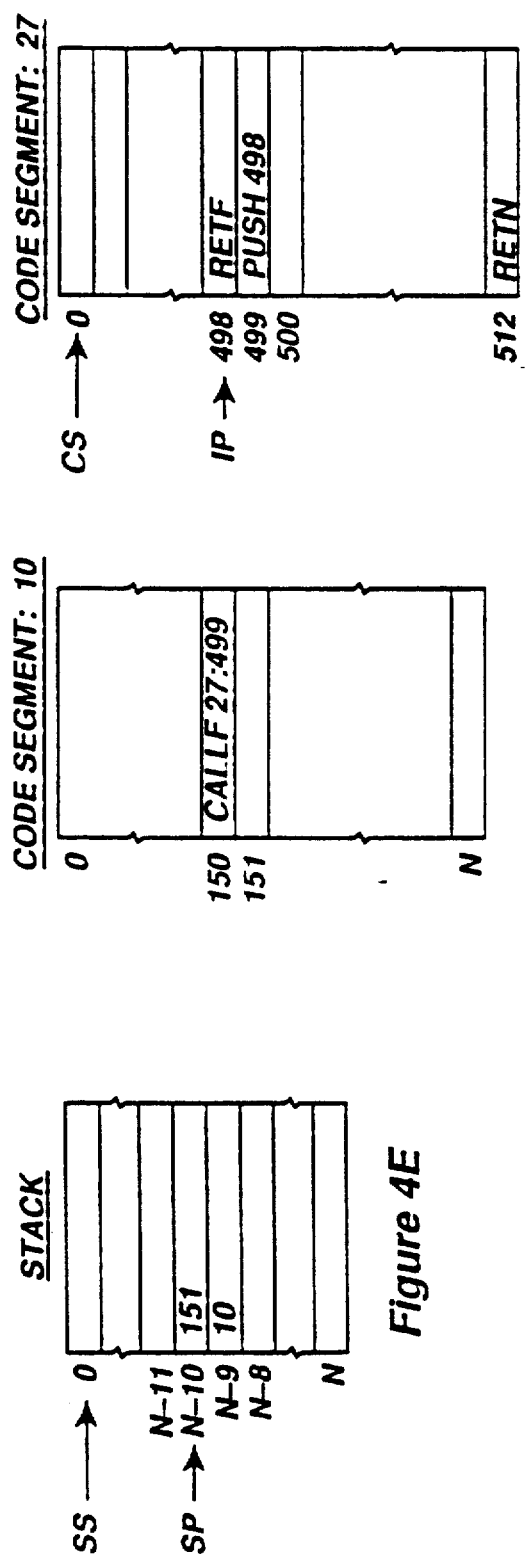
Figure 4F:
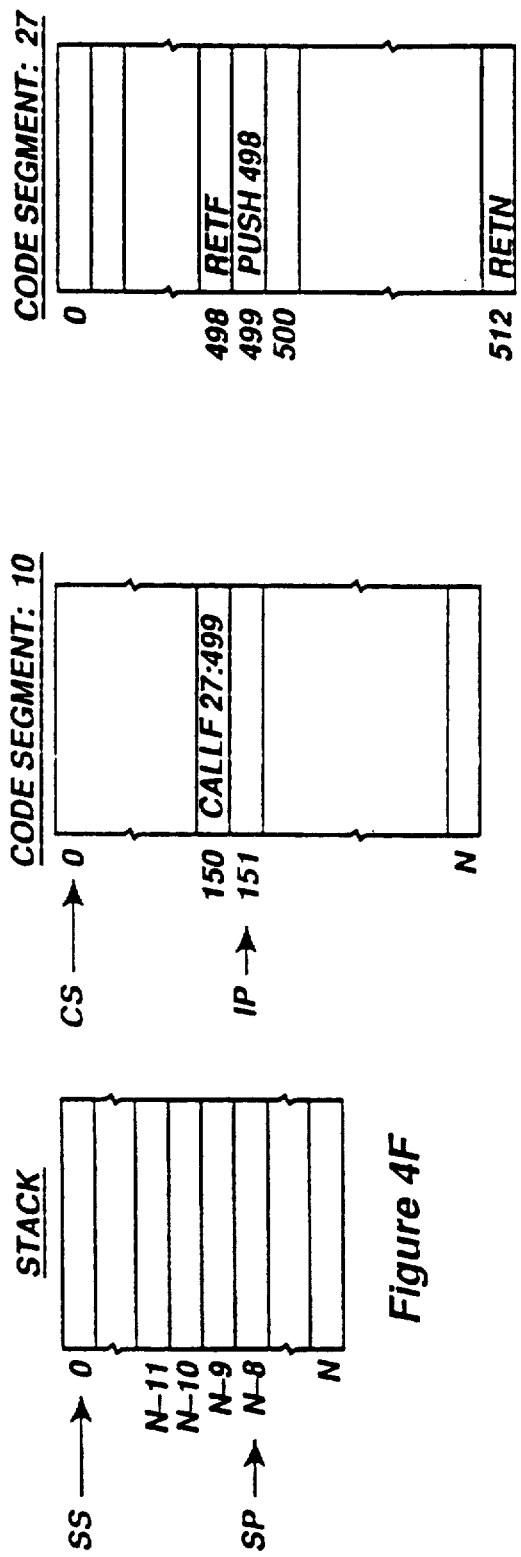
Figure 5A:
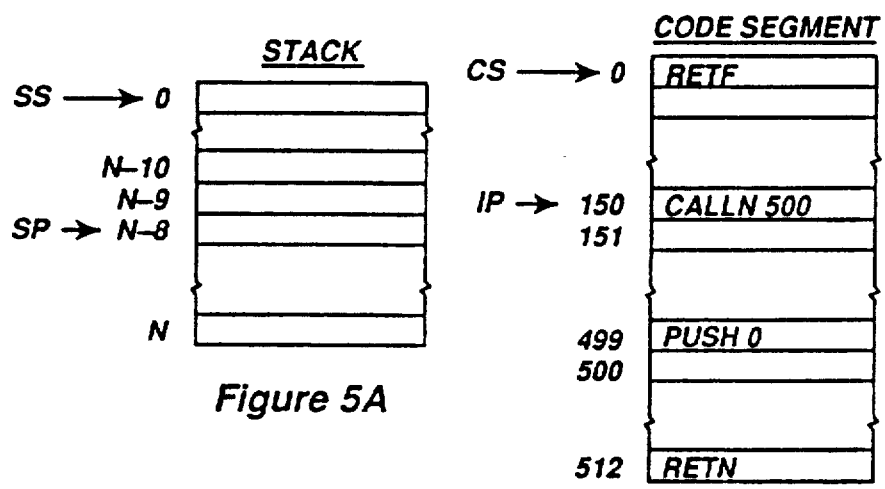
FIGS. 5A through 5D trace the execution of a near call and near return of a preferred embodiment of the present invention.
Figure 5B:
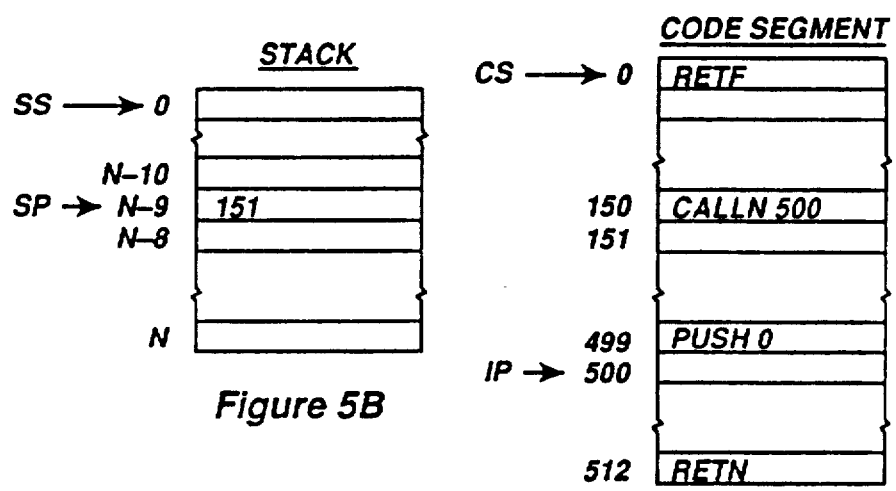
Figure 5C:
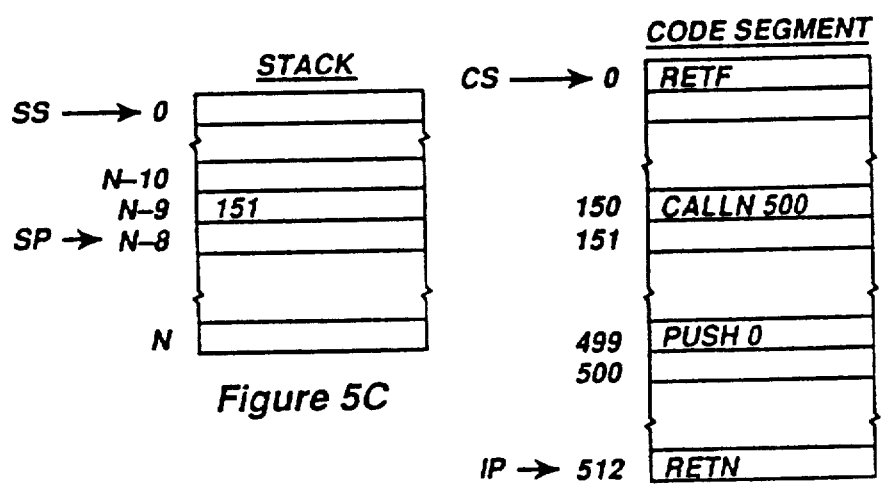
Figure 5D:
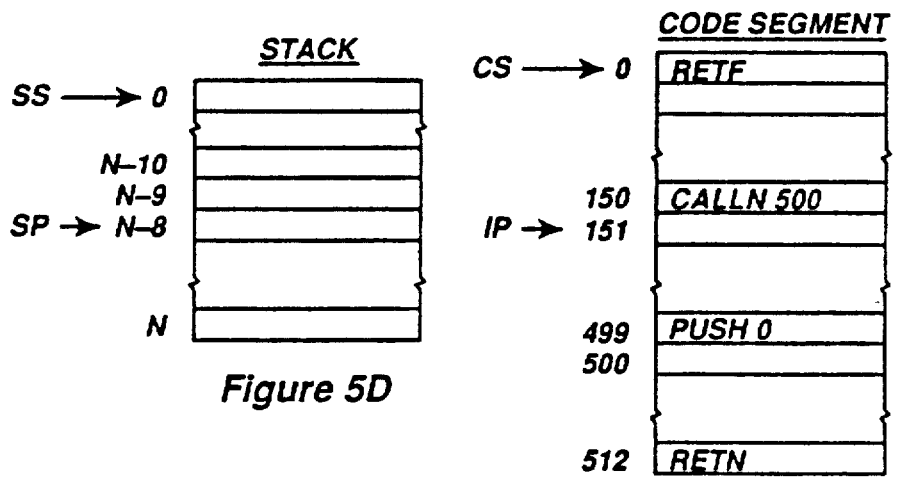

FIG. 4D shows the state of the processor before the RETN instruction is executed. The top of the stack contains the offset 498 of the RETF instruction. When the RETN instruction is executed, the offset 498 is popped from the stack and the IP register is set to that value. FIG. 4E shows the state of the processor after the RETN is executed. The IP register points to the RETF instruction. When the RETF instruction is executed, offset 151 and code segment number 10 are popped from the stack. The CS register is set to point to code segment number 10 and the IP register is set to point to the offset 151. FIG. 4F shows the state of the processor after the RETF is executed. The CS register points to code segment number 10, and the IP register points to the instruction after the CALLF instruction to complete the return from the subroutine.

The use by a far call instruction of the alternate entry point at offset 499 allows the offset of the RETF instruction to be pushed onto the stack. When the RETN instruction at the end of the subroutine is executed, the offset of the RETF instruction is popped from the stack and execution continues at the RETF instruction. The RETF instruction then causes the code segment number and offset of the return address to be popped from the stack to effect the far return.

FIGS. 5A through 5D and 6A through 6F show a preferred embodiment of the present invention. FIGS. 5A through 5D trace the execution of the near call and near return. Again, the execution is the same as shown in FIGS. 1A through 1D and 3A through 3D. The subroutine stored at offset 500 through 512 is the same. However, in the preferred embodiment, a RETF instruction and a "PUSH 0" instruction are included in the code segment. The RETF instruction is stored at offset 0 in the code segment and the "PUSH 0" instruction is stored at offset 499.

The execution of the call and return functions is similar to the embodiment shown in FIGS. 3A through 3D and 4A through 4F. An advantage of the preferred embodiment is that for certain computers, such as those based on the 8086-family, the "PUSH 0" instruction can be stored as a 2-byte instruction: 1-byte operation code and 1 byte of immediate data, the 0. Whereas PUSH instructions typically are a 6-byte instruction. Also the RETF instruction needs to be stored once for each code segment, rather than once for each subroutine. In other words, all the subroutines in a given code segment can share the same RETF instruction. One skilled in the art would appreciate that one byte of immediate data can refer to offsets less than 128 or greater than 65,407.

Figure 6A:
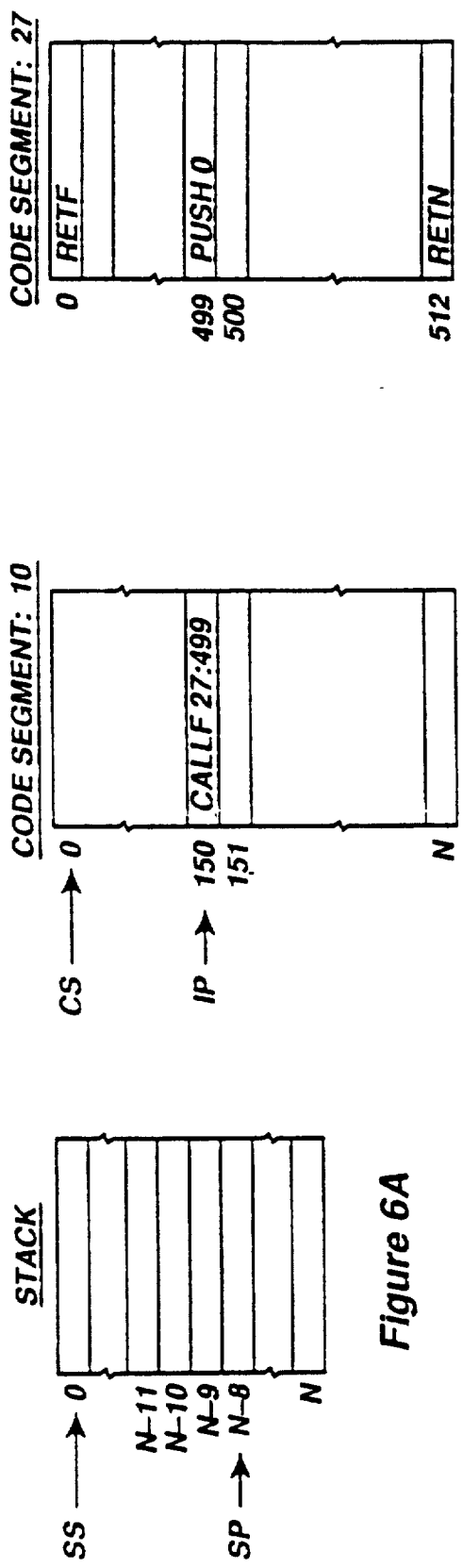
FIGS. 6A through 6F trace the execution of a far call and far return of a preferred embodiment of the present invention.
Figure 6B:
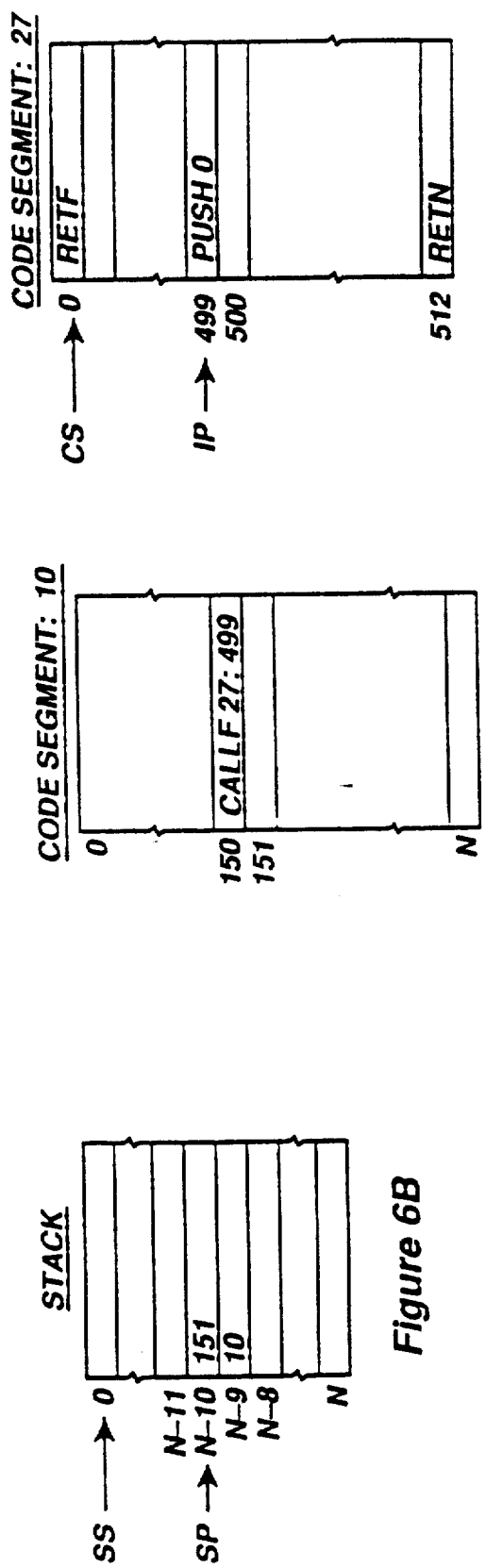

FIGS. 6A through 6F trace the execution of a far call and far return in the preferred embodiment. Tracing the execution of the far call and far return will show how the same subroutine can be invoked either by a far call or a near call and return to the proper address. FIG. 6A shows the state of the processor before the "CALLF 27:499" instruction is executed. The execution of the far call causes the return address, that is, the code segment number 10 and the offset 151, to be pushed onto the stack. The execution also causes the CS register to be set to 27 and the IP register to be set to 499. The offset 499 can be considered a secondary entry point into the subroutine. The 499 entry point is used by far calls. FIG. 6B shows the state of the processor after the CALLF instruction is executed.

Figure 6C:
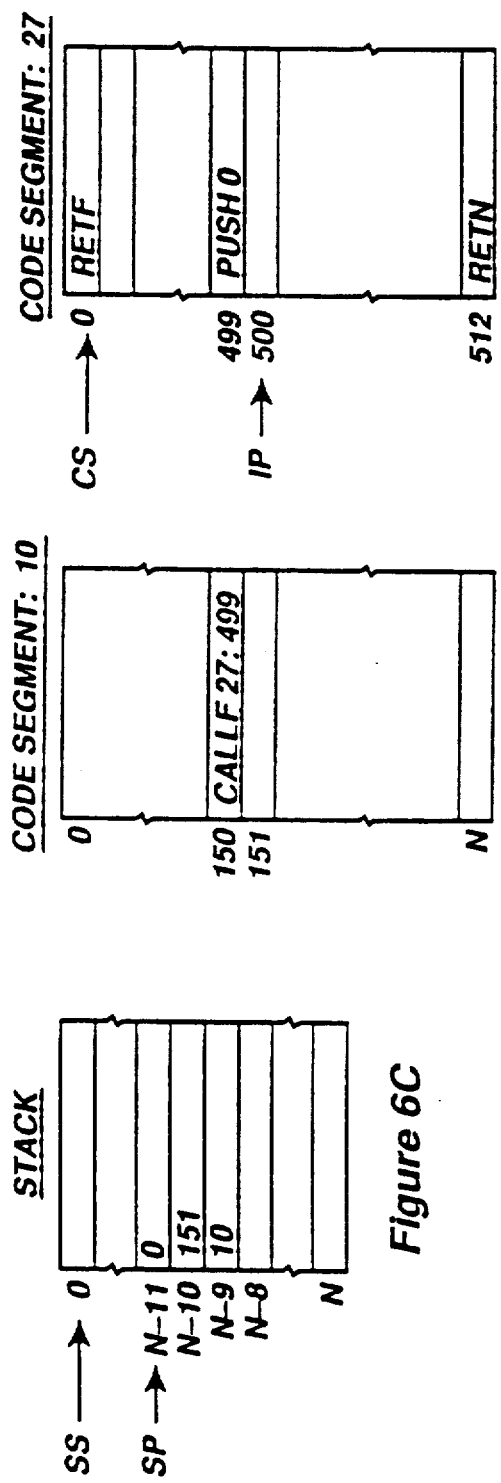

FIG. 6C shows the state of the processor after the "PUSH 0" instruction is executed. The PUSH instruction pushes the offset 0, which is the offset of the RETF instruction, onto the stack and the IP register is set to point to the next instruction offset 500.

Figure 6D:
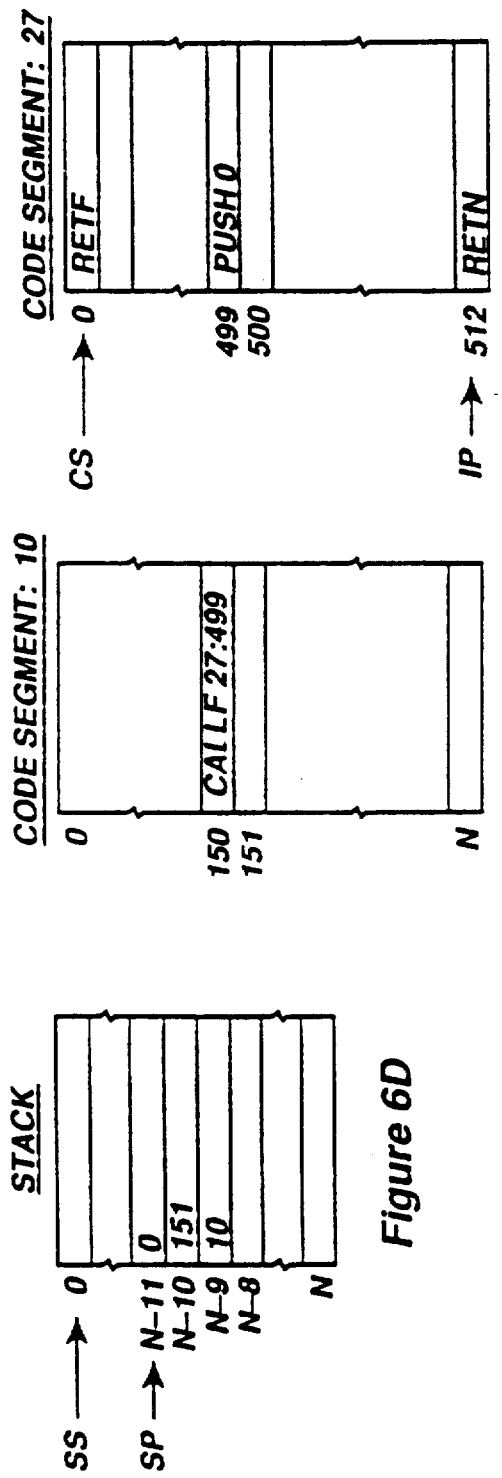
Figure 6E:
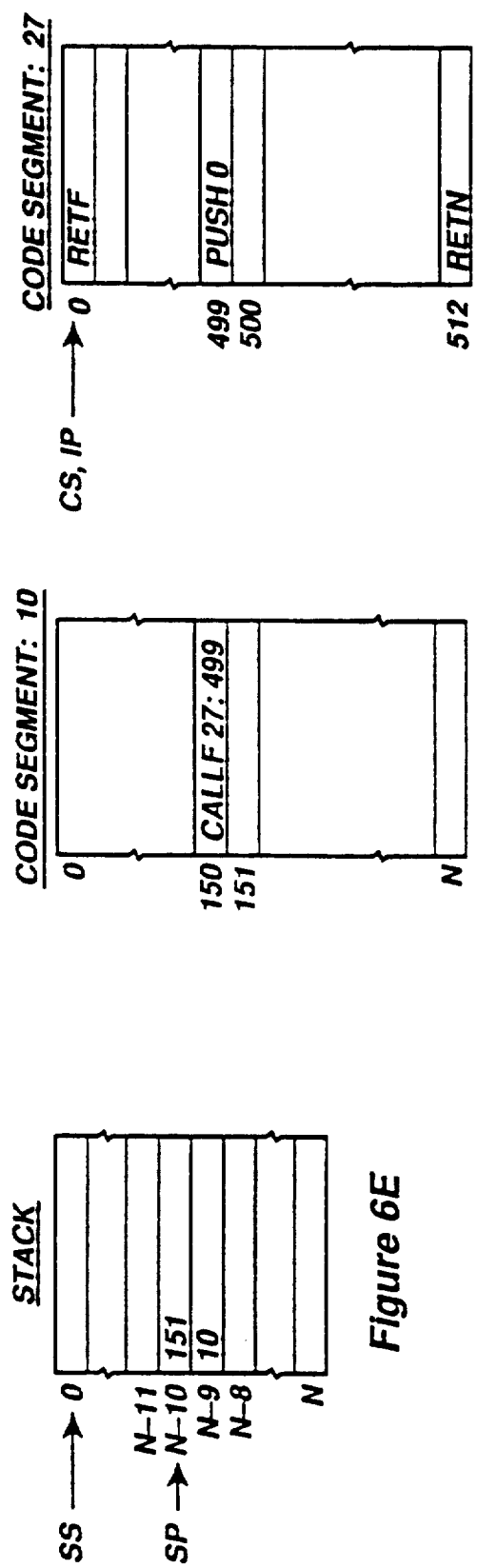
Figure 6F:
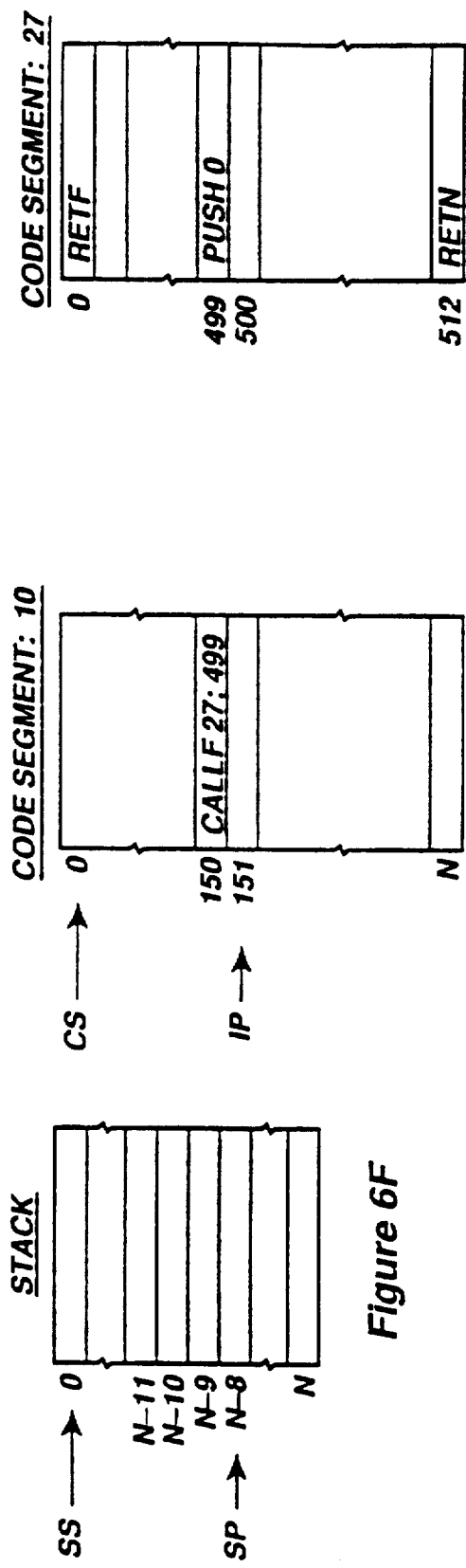

FIG. 6D shows the state of the processor before the RETN instruction is executed. The top of the stack contains offset 0, which is the offset of the RETF instruction. When the RETN instruction is executed, the offset 0 is popped from the stack and the IP register is set to that value. FIG. 6E shows the state of the processor after the RETN instruction is executed. The IP register points to the RETF instruction. When the RETF instruction is executed, offset 151 and code segment number 10 are popped from the stack. The CS register is set to point to code segment number 10 and the IP register is set to point to the offset 151. FIG. 6F shows the state of the processor after the RETF instruction is executed. The IP register points to the instruction after the CALLF instruction to complete the return from the subroutine.

Although the present invention has been described in terms of preferred embodiments, it is not intended that the invention be limited to these embodiments. Modifications within the spirit of the invention will be apparent to those skilled in the art. The scope of the present invention is defined by the claims that follow.

What is claimed is:

1. A method for invoking and returning from a subroutine on a computer having code segments, an instruction set, and an instruction pointer, the instruction set having a near call instruction for intra-code segment invoking of the subroutine, a near return instruction for intra-code segment returning from the subroutine, a far call instruction for inter-code segment invoking of the subroutine, and a far return instruction for inter-code segment returning from the subroutine, the subroutine comprising a plurality of instructions from the instruction set being stored in a code segment, the subroutine having a far entry point, each code segment having a plurality of locations for storing instructions, each location within a code segment having an associated offset within the code segment, the method comprising the steps of:

executing the far call instruction specifying the far entry point of the subroutine to be executed;

when executing the subroutine in response to executing the far call instruction specifying the far entry point, storing the offset of a location containing the far return instruction that is located in the code segment in which the subroutine is stored, the offset being less than 128 or greater than 65,407;

executing the near return instruction to retrieve the location of the stored offset and to set the instruction pointer to point to the location of the stored offset; and executing the far return instruction pointed to by the instruction pointer to effect a return to an instruction following the executed far call instruction.

2. The method of claim 1 wherein the computer is based on the architecture of the Intel 8086-family of microprocessors, the computer having a stack and a push instruction, the push instruction comprising an operation code and immediate data, and wherein the step of storing the offset includes the step of executing the push instruction to push the offset onto the stack.

3. The method of claim 2 wherein the step of executing the push instruction includes the steps of retrieving a one-byte operation code and retrieving one byte of immediate data.

4. The method of claim 3 wherein the step of retrieving one byte of immediate data includes the step of retrieving one byte containing a value of zero.

5. The method of claim 1 including the step of executing an instruction located at a near entry point of the subroutine that is located at an offset immediately after the far entry point.

6. The method of claim 1 wherein the step of storing the offset includes the step of executing a push instruction to push the offset onto a stack.

7. The method of claim 1 wherein the step of storing the offset includes the step of storing a zero value.

8. A method for computer subroutine linkage on a computer having a stack, a push instruction, code segments, memory locations identified by segmented addresses comprising a segment portion and an offset portion, and a near call instruction for intra-code segment subroutine invoking, a near return instruction for intra-code segment subroutine returning, a far call instruction for inter-code segment subroutine invoking, and a far return instruction for inter-code segment subroutine returning, the computer having a subroutine, the subroutine having a near entry point, the subroutine located in a code segment, the method comprising the steps of:

storing the push instruction in the memory location before the near entry point of the subroutine, the stored push instruction to push the offset of a memory location containing the far return instruction onto the stack;

storing the far return instruction in a memory location with an offset less than 128 or greater than 65,407 in the code segment in which the subroutine is located; and storing the near return instruction in a memory location within the subroutine whereby when the subroutine is invoked using the far call instruction a far return address is pushed onto the stack and control is transferred to the memory location containing the stored push instruction, when the stored push instruction is executed the offset of the stored far return instruction is pushed onto the stack, when the stored near return instruction is executed the offset pushed by the executed push instruction is popped from the stack and control is transferred to the stored far return instruction at the popped offset, and when the stored far return instruction is executed the far return address pushed by the far call instruction is popped from the stack and control is transferred to the far return address.

9. The method of claim 8 wherein the step of storing the far return instruction stores the far return instruction at offset zero.

10. A method of modifying a computer subroutine designed to execute on a computer having a near call instruction for intra-code segment subroutine invoking, a near return instruction for intra-code segment subroutine returning, a far call instruction for inter-code segment subroutine invoking, a far return instruction for inter-code segment subroutine returning, and a push instruction, the computer having a stack, code segments, and segmented addresses, the segmented addresses comprising a code segment number and an offset, the subroutine having a near entry point designed to be invoked by the near call instruction, the subroutine located in a code segment, the method comprising the steps of:

> storing in the code segment in which the subroutine is located at an offset less than 128 or greater than 65,407 the far return instruction; and
>
> storing in the code segment in which the subroutine is located at a far entry point the push instruction to push onto the stack the offset of the stored far return instruction such that the near entry point is entered after the push instruction is executed, whereby when the subroutine is invoked using the far call instruction through the far entry point the stored push instruction stores the offset of the stored far return instruction onto the stack and when the subroutine returns using the near return instruction the near return instruction retrieves the offset of the stored far return instruction and transfers control to the stored far return instruction to return from the subroutine.

11. The method of claim 10 wherein the step of storing the stored far return instruction stores the far return instruction at offset zero.

12. A method in a computer system of invoking and returning from a subroutine, the computer system having code segments and an instruction set having instructions, each code segment having memory locations, each memory location for storing an instruction and having an offset within the code segment, the instruction set having a near call instruction for intra-code segment invocations of the subroutine, a near return instruction for returning from intra-code segment invocations of the subroutine, a far call instruction for inter-code segment invocations of the subroutine, and a far return instruction for returning from inter-code segment invocations of the subroutine, the subroutine having a plurality of instructions stored within memory locations of a designated code segment, one of the memory locations of the subroutine being a far entry point, the method comprising the steps of:

> executing the far call instruction to invoke the subroutine through the far entry point; and
>
> executing the subroutine, wherein the step of executing the subroutine includes the steps of:
>
> storing the offset of a predefined memory location within the designated code segment containing the far return instruction,
>
> executing the near return instruction to retrieve the stored offset of the predefined memory location and to transfer execution control to the retrieved offset; and
>
> executing the far return instruction contained in the memory location at the retrieved offset within the designated code segment to return from the subroutine.

13. The method of claim 12 including the steps of storing another subroutine within the designated code segment and during execution of the other subroutine, executing the far return instruction contained in the predefined memory location to return from the other subroutine.

14. The method of claim 12 wherein the step of storing the offset includes the step of storing an offset less than 128.

15. The method of claim 12 wherein the step of storing the offset includes the step of storing an offset greater than 65,407.

16. The method of claim 12 wherein the instruction set includes an instruction for storing immediate data contained within the instruction and wherein the step of storing the offset of the predefined memory location includes the step of executing the instruction for storing immediate data.

17. The method of claim 16 wherein the step of executing the instruction for storing immediate data includes the step of storing a zero value as the offset of the predefined memory location.

* * * * *